(12) United States Patent
Chiu et al.

(10) Patent No.: US 11,858,635 B2
(45) Date of Patent: Jan. 2, 2024

(54) AUTOMATIC SPRAYING UNMANNED AERIAL VEHICLE SYSTEM BASED ON DYNAMIC ADJUSTMENT OF EARLY WARNING RANGE, AND METHOD THEREOF

(71) Applicants: SQ Technology (Shanghai) Corporation, Shanghai (CN); Inventec Corporation, Taipei (TW)

(72) Inventors: Chaucer Chiu, Taipei (TW); Hong Fu, Shanghai (CN)

(73) Assignees: SQ Technology (Shanghai) Corporation, Shanghai (CN); Inventec Corporation, Taipei (TW)

( * ) Notice: Subject to any disclaimer, the term of this patent is extended or adjusted under 35 U.S.C. 154(b) by 65 days.

(21) Appl. No.: 17/679,878

(22) Filed: Feb. 24, 2022

(65) Prior Publication Data
US 2023/0150665 A1 May 18, 2023

(30) Foreign Application Priority Data
Nov. 18, 2021 (CN) .......................... 202111367913.3

(51) Int. Cl.
*B64D 1/18* (2006.01)
*B64C 39/02* (2023.01)
(Continued)

(52) U.S. Cl.
CPC .............. *B64D 1/18* (2013.01); *B64C 39/024* (2013.01); *B64D 47/08* (2013.01);
(Continued)

(58) Field of Classification Search
CPC ........ B64D 1/18; B64D 47/08; B64C 39/024; B64U 2201/10; B64U 2201/00;
(Continued)

(56) References Cited

U.S. PATENT DOCUMENTS 11,130,573 B2 * 9/2021 Holly .................... G05D 7/0617
11,235,874 B2 * 2/2022 Jones .................... B64C 39/024
(Continued)

OTHER PUBLICATIONS

Tom Wolf, Sprayers 101 website article, https://sprayers 101.com/challenges-drone/ Feb. 18, 2019 "The challenges of Spraying by Drone".*

*Primary Examiner* — Benjamin P Lee
(74) *Attorney, Agent, or Firm* — David R. Stevens; Stevens Law Group (57) ABSTRACT

An automatic spraying unmanned aerial vehicle (UAV) system based on dynamic adjustment of early warning range and a method thereof are disclosed. In the automatic spraying UAV system, an unmanned aerial vehicle analyzes a forward direction and a forward speed of a staff appearing in an environment video, calculates a preset distance, and generates an early-warning range by extending outwardly a spraying range by a preset distance; when determining the staff appears within the early-warning range in the environment video, the unmanned aerial vehicle pauses an automatic spraying operation, so as to achieve the technical effect of improving safety of the staff in an operation area by dynamically adjusting the early-warning range of the automatic spraying operation of the unmanned aerial vehicle.

10 Claims, 9 Drawing Sheets

(51) Int. Cl.
*B64D 47/08* (2006.01)
*B64U 101/00* (2023.01)
*B64U 101/30* (2023.01)

(52) U.S. Cl.
CPC ...... *B64U 2101/00* (2023.01); *B64U 2101/30* (2023.01); *B64U 2201/10* (2023.01)

(58) Field of Classification Search
CPC ............ B64U 2201/30; B64U 2101/30; G08G 5/006; G08G 5/0069; G05D 1/106; A01M 7/00
See application file for complete search history.

(56) References Cited

U.S. PATENT DOCUMENTS

| | | | |
|---|---|---|---|
| 11,338,921 B2 * | 5/2022 | Holly | B64C 39/024 |
| 2016/0307448 A1 * | 10/2016 | Salnikov | G08G 5/0043 |
| 2018/0065747 A1 * | 3/2018 | Cantrell | G05D 1/0011 |
| 2018/0319499 A1 * | 11/2018 | Holly | B64D 1/18 |
| 2019/0138010 A1 * | 5/2019 | Wu | B64D 1/18 |
| 2021/0110724 A1 * | 4/2021 | Wake | G08G 5/0013 |
| 2021/0403163 A1 * | 12/2021 | Holly | G05D 7/0617 |
| 2022/0153417 A1 * | 5/2022 | Faers | B64C 39/024 |
| 2022/0254155 A1 * | 8/2022 | Janssen | A01M 21/043 |
| 2022/0340278 A1 * | 10/2022 | Faers | B64C 39/02 |
| 2023/0112766 A1 * | 4/2023 | Norcia | B64C 39/024 701/3 |
| 2023/0135631 A1 * | 5/2023 | Faers | B64U 80/30 701/3 |

* cited by examiner

AUTOMATIC SPRAYING UNMANNED AERIAL VEHICLE SYSTEM BASED ON DYNAMIC ADJUSTMENT OF EARLY WARNING RANGE, AND METHOD THEREOF

CROSS-REFERENCE TO RELATED APPLICATION

This application claims the benefit of Chinese Application Serial No. 202111367913.3, filed Nov. 18, 2021, which is hereby incorporated herein by reference in its entirety.

BACKGROUND OF THE INVENTION

1. Field of the Invention

The present invention is related to an automatic spraying unmanned aerial vehicle (UAV) system and a method thereof, and more particularly to an automatic spraying unmanned aerial vehicle (UAV) system capable of dynamically adjusting an early-warning range during an automatic spraying operation to improve safety of a staff, and a method thereof.

2. Description of the Related Art

In recent years, unmanned aerial vehicles are applied in various fields; for example, the unmanned aerial vehicle can be applied for spraying on a large operation area, that is, the unmanned aerial vehicle performs an automatic spraying operation on the large operation area along a preset path, so that the labor cost can be greatly reduced.

However, the conventional unmanned aerial vehicle only performs the automatic spraying operation on the large operation area along the preset path, but when an unexpected staff appears in the operation area, the unmanned aerial vehicle is unable to immediately make a decision to pause the automatic spraying operation in response to the staff appearing in the operation area, and it may cause safety concerns about the automatic spraying operation on the large operation area.

Therefore, what is needed is to develop an improved solution to solve the conventional technology problem that the conventional unmanned aerial vehicle may cause safety concerns because the conventional unmanned aerial vehicle only performs the automatic spraying operation along the preset path and is unable to intelligently control the automatic spraying operation when an unexpected staff appears in the operation area.

SUMMARY OF THE INVENTION

An objective of the present invention is to disclose an automatic spraying unmanned aerial vehicle (UAV) system based on dynamic adjustment of early warning range and a method thereof, so as to solve the conventional technology problem that the conventional unmanned aerial vehicle may cause safety concerns because the conventional unmanned aerial vehicle only performs the automatic spraying operation along the preset path and is unable to intelligently control the automatic spraying operation when an unexpected staff appears in the operation area.

In order to achieve the objective, the present invention provides an automatic spraying unmanned aerial vehicle (UAV) system based on dynamic adjustment of early warning range, and the automatic spraying unmanned aerial vehicle (UAV) system includes an unmanned aerial vehicle and a path server; the unmanned aerial vehicle includes a UAV transmission module, a flight control module, an image analysis module, a range calculation module, and a spraying control module; the path server includes a server transmission module and a path generation module.

The UAV transmission module is configured to receive an operation path, transmit a recorded flight path of the unmanned aerial vehicle, and receive a second operation path. The flight control module is configured to control the unmanned aerial vehicle to perform an automatic spraying operation with a spraying range based on a flight altitude, a flight speed and an operation path, and control the unmanned aerial vehicle to perform the automatic spraying operation with the spraying range again based on the flight altitude, the flight speed and a second operation path. The image analysis module is configured to obtain an environment video during the automatic spraying operation of the unmanned aerial vehicle, and analyze a forward direction and a forward speed of a staff in the environment video. When determining that the forward direction is intersected with the spraying range, the range calculation module calculates a relative speed between the forward speed and the flight speed, calculates a preset distance based on the relative speed and an early-warning time, and calculates an early-warning range by extending outwardly from the spraying range by a preset distance. When determining that the staff appears within the early-warning range in the environment video, the spraying control module pauses the automatic spraying operation, and records a flight path where the unmanned aerial vehicle pauses the automatic spraying operation, wherein when determining that no staff appears within the early-warning range in the environment video, the spraying control module resumes the automatic spraying operation and stops recording the flight path of the unmanned aerial vehicle.

The server transmission module is configured to receive the recorded flight path of the unmanned aerial vehicle from the UAV transmission module, and transmit the second operation path to the UAV transmission module. The path generation module is configured to generate the second operation path based on position information and the flight path of the unmanned aerial vehicle, and at least one marked range generated with reference to the early-warning range.

In order to achieve the objective, the present invention provides an automatic spraying unmanned aerial vehicle (UAV) method based on dynamic adjustment of early warning range, and the automatic spraying unmanned aerial vehicle (UAV) method includes steps of: receiving an operation path, by an unmanned aerial vehicle; controlling the unmanned aerial vehicle to perform an automatic spraying operation with a spraying range based on a flight altitude, a flight speed and an operation path; obtaining an environment video during the automatic spraying operation, and analyzing a forward direction and a forward speed of a staff in the environment video; when the unmanned aerial vehicle determines that the forward direction is intersected with the spraying range, calculating a relative speed between the forward speed and the flight speed, calculating a preset distance based on the relative speed and an early-warning time, and calculating an early-warning range by extending outwardly from the spraying range by a preset distance; when the unmanned aerial vehicle determines that a staff appears within an early-warning range in the environment video, pausing the automatic spraying operation and recording the flight path where the unmanned aerial vehicle pauses the automatic spraying operation; when the unmanned aerial vehicle determines that no staff appears within the early-warning range in the environment video, resuming the automatic spraying operation and stopping recording the flight path of the unmanned aerial vehicle; transmitting the recorded flight path of the unmanned aerial vehicle to a path server; generating a second operation path based on position information and the flight path of the unmanned aerial vehicle, and at least one marked range generated with reference to the early-warning range, by the path server; transmitting the second operation path to the unmanned aerial vehicle, by the path server; controlling the unmanned aerial vehicle to perform the automatic spraying operation again based on the flight altitude, the flight speed, and the second operation path.

According to the above-mentioned system and method of the present invention, the difference between the present invention and the conventional technology is that the unmanned aerial vehicle of the automatic spraying UAV system of the present invention analyzes the forward direction and the forward speed of the staff appearing in an environment video, calculates the preset distance, and generates the early-warning range by extending outwardly the spraying range by the preset distance; when determining the staff appears within the early-warning range in the environment video, the unmanned aerial vehicle pauses the automatic spraying operation.

Therefore, the technical solution of the present invention is able to achieve the technical effect of improving safety of the staff in an operation area by dynamically adjusting the early-warning range of the automatic spraying operation of the unmanned aerial vehicle.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims.

These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts. As used herein, the singular forms "a", "an" and "the" are intended to include the plural forms as well, unless the context clearly indicates otherwise.

It is to be acknowledged that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the words "comprise" and "include", and variations such as "comprises", "comprising", "includes", or "including", will be acknowledged to imply the inclusion of stated elements but not the exclusion of any other elements.

The automatic spraying unmanned aerial vehicle (UAV) system based on dynamic adjustment of early warning range will be illustrated in the following paragraphs. Please refer to FIG. 1, which is a system block diagram of an automatic spraying unmanned aerial vehicle (UAV) system based on dynamic adjustment of early warning range, according to the present invention.

Figure 1:
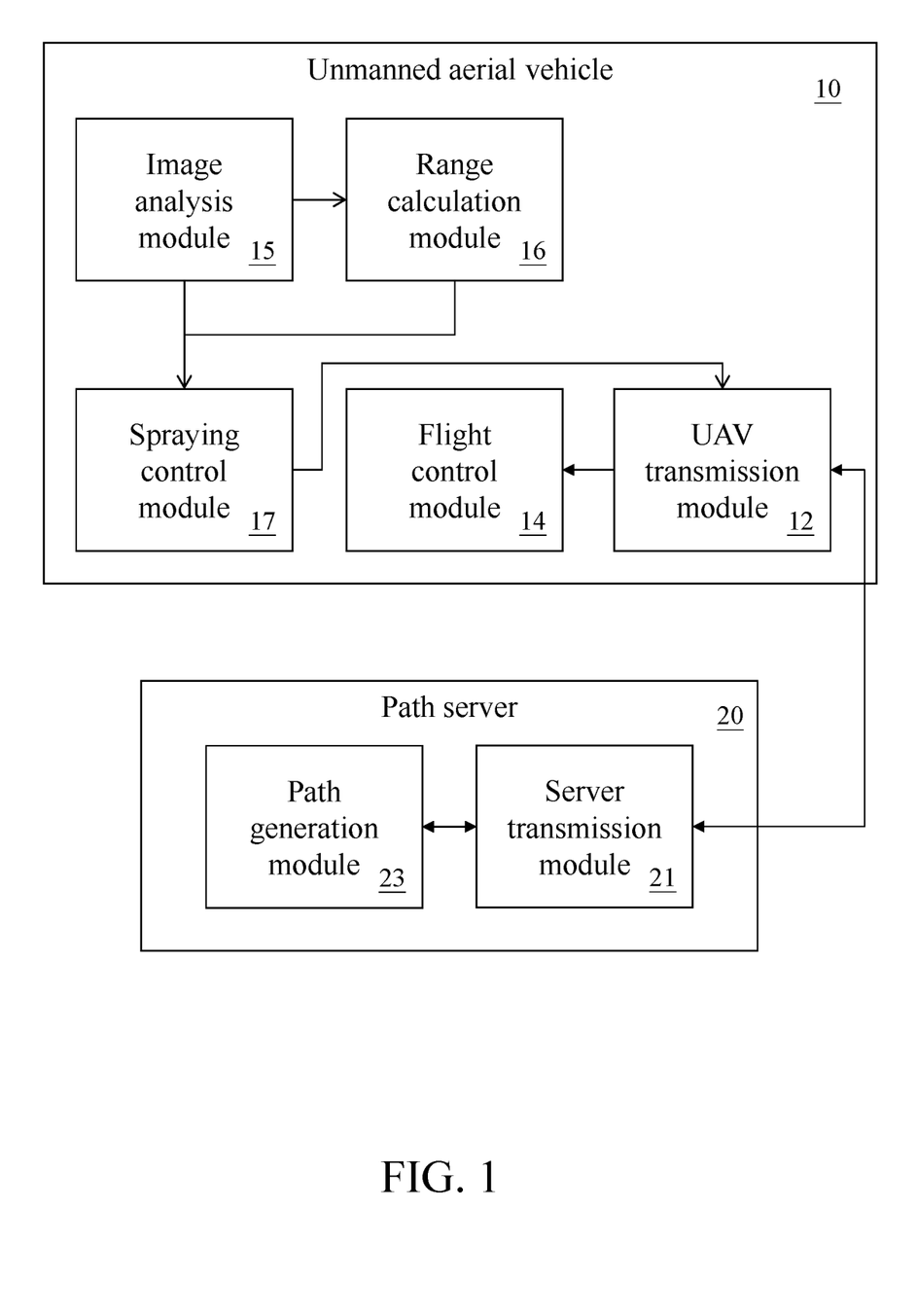
FIG. 1 is a system block diagram of an automatic spraying unmanned aerial vehicle (UAV) system based on dynamic adjustment of early warning range, according to the present invention.

As shown in FIG. 1, the automatic spraying unmanned aerial vehicle (UAV) system includes an unmanned aerial vehicle 10 and a path server 20, the unmanned aerial vehicle 10 includes a UAV transmission module 12, a flight control module 14, an image analysis module 15, a range calculation module 16, and a spraying control module 17. The path server includes a server transmission module 21 and a path generation module 23.

The unmanned aerial vehicle 10 is an unmanned aerial vehicle used to spray pesticides or water on a large area of agricultural land. The unmanned aerial vehicle 10 is interconnected with the path server 20 through wireless transmission manner; for example, the wireless transmission manner can be Wi-Fi, or mobile communication network (such as 3G, 4G, or The unmanned aerial vehicle 10 obtains position information through a global position system in every period, and the period can be, for example, every 5 seconds, every 30 seconds or every minute. The UAV transmission module 12 transmits the position information.

Figure 2:
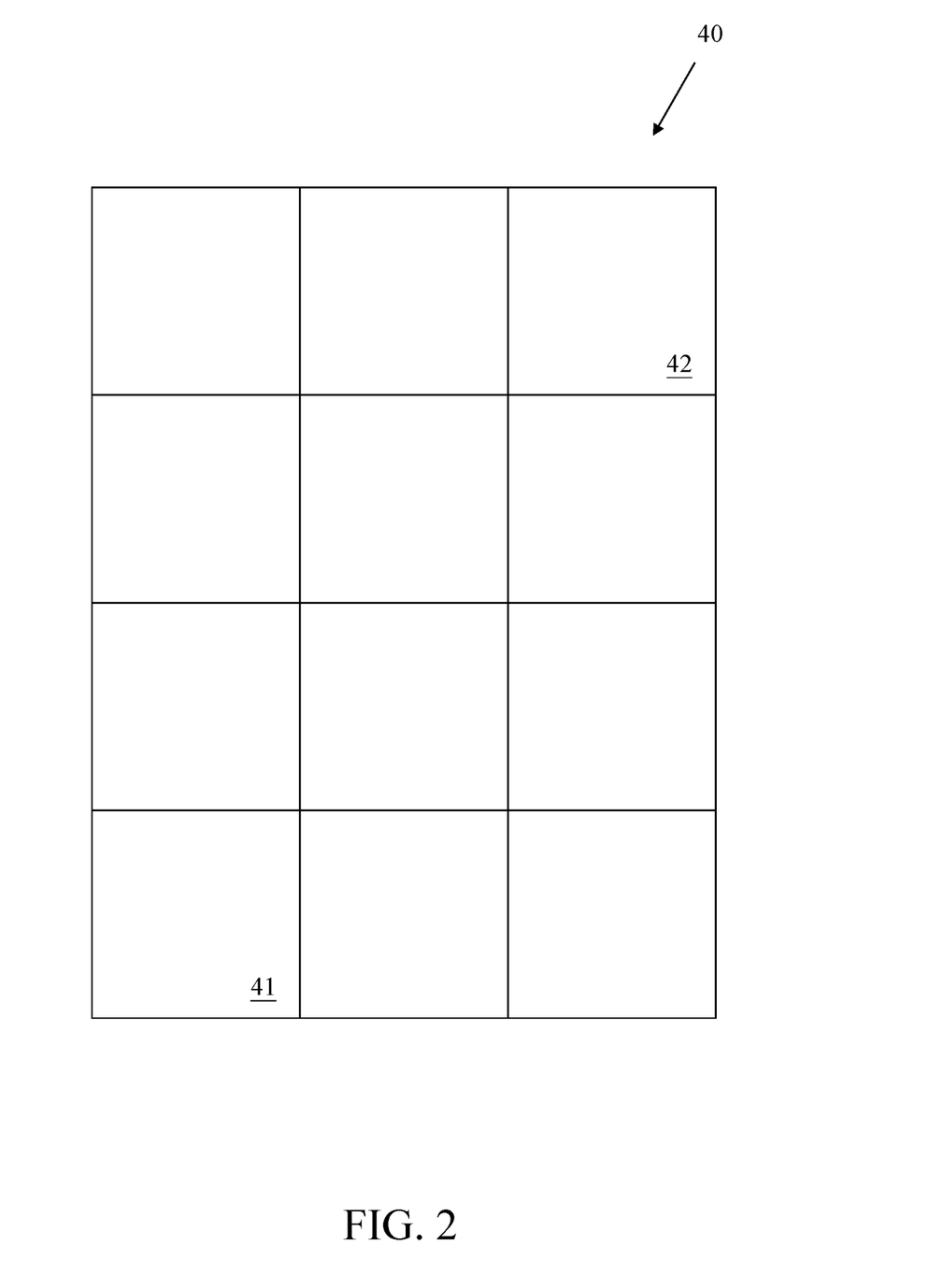
FIG. 2 is a schematic view showing an operation area of an automatic spraying unmanned aerial vehicle (UAV) system based on dynamic adjustment of early warning range, according to the present invention.

Please refer to FIG. 2, which is a schematic view showing an operation area of an automatic spraying operation, according to the present invention.

The unmanned aerial vehicle 10 receives an operation starting position 41 and an operation ending position 42 from an external electronic device (not shown in figures) through a wireless transmission manner. The external electronic device can be, for example, a general computer, a notebook computer or a smartphone. The unmanned aerial vehicle 10 provides the operation starting position 41 and the operation ending position 42 to other device.

Figure 3:
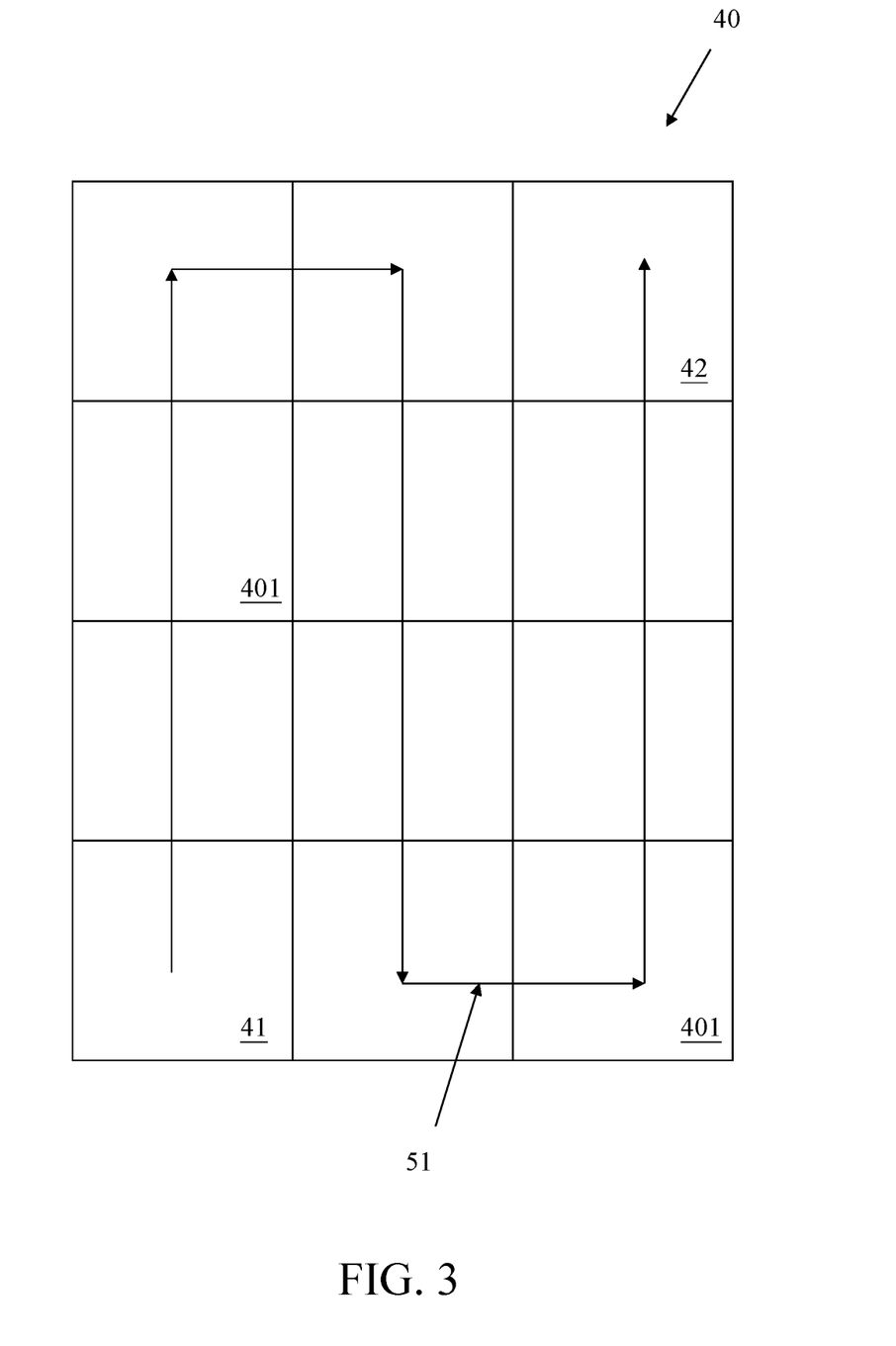
FIG. 3 is a schematic view showing an operation path of an automatic spraying unmanned aerial vehicle (UAV) system based on dynamic adjustment of early warning range, according to the present invention.

The path server 20 receives the position information from the unmanned aerial vehicle and receives the operation starting position 41 and the operation ending position 42 from the unmanned aerial vehicle 10. The path server 20 queries an operation area 40 based on the position information and divides the operation area 40 into multiple operation sub-areas 401, and the path server 20 then generates an operation path 51 based on the operation starting position 41, the operation ending position 42 and the operation sub-areas 401. Please refer to FIG. 3, which shows a schematic view of the operation path 51. FIG. 3 is a schematic view showing the operation path of the automatic spraying operation, according to the present invention.

The path server 20 provides the operation path 51 to the unmanned aerial vehicle 10; alternatively, the unmanned aerial vehicle 10 can receive the operation path 51 through an external electronic device (not shown in figures). The flight control module 14 controls the unmanned aerial vehicle 10 to perform the automatic spraying operation with the spraying range based on a flight altitude, a flight speed and the operation path. For example, the spraying range, the flight altitude and the flight speed can be pre-stored in the unmanned aerial vehicle 10, or provided by the external electronic device, or provided by the path server 20.

The image analysis module 15 can obtain an environment video during the automatic spraying operation, and analyze a forward direction and a forward speed of a staff appearing in the environment video. In an embodiment, the image analysis module 15 captures two successive environment images, in which the staff appears, from the environment video, and analyzes the forward direction of the staff based on positions of the staff in the two environment images, and calculates a displacement between the positions of the staff in the two environment images, and calculate the forward speed of the staff by dividing the displacement by a capture time difference between the two environment images.

It should be noted that the unmanned aerial vehicle 10 can calculate the relative speed between the forward speed and the flight speed based on the flight altitude, environment information and droplet dispersion information; the droplet dispersion information can be pre-stored in the unmanned aerial vehicle 10, or provided by the path server 20, or provided by the external electronic device. The droplet dispersion information includes parameters of a spraying head used in the unmanned aerial vehicle 10 or additive in the spraying liquid; the spraying head can be, for example, air-assisted sprays or an electrostatic nozzle; the additive can be, for example, polymerized ethylene oxide, polyacrylamide or polysaccharide. The spraying range 61 can be calculated by the evaluation software "DRIFTSIM" developed by Architectural Technology Research Unit (ATRU) and U.S. Ohio State University; for example, the wind direction, the wind speed, the temperature and relative humidity in the environment information, and the droplet size and droplet speed in the droplet dispersion information, and the flight altitude can be inputted into the evaluation software "DRIFTSIM" to calculate the spraying range 61 corresponding to the above-mentioned conditions.

When determining that the forward direction is intersected with the spraying range, the range calculation module 16 calculates the relative speed between the forward speed and the flight speed, calculates a preset distance based on the relative speed and an early-warning time, and calculates an early-warning range 62 by extending outwardly from the spraying range by a preset distance; that is, the range calculation module 16 can calculate a component of a flight speed in the forward direction, subtract the flight speed by the component and use an absolute value of the subtraction result as the relative speed, multiply the relative speed by the early-warning time to obtain the preset distance, and calculate the early-warning range 62 by extending outwardly from the spraying range by the preset distance. It should be noted that the early-warning range 62 covers the spraying range 61.

Figure 4A:
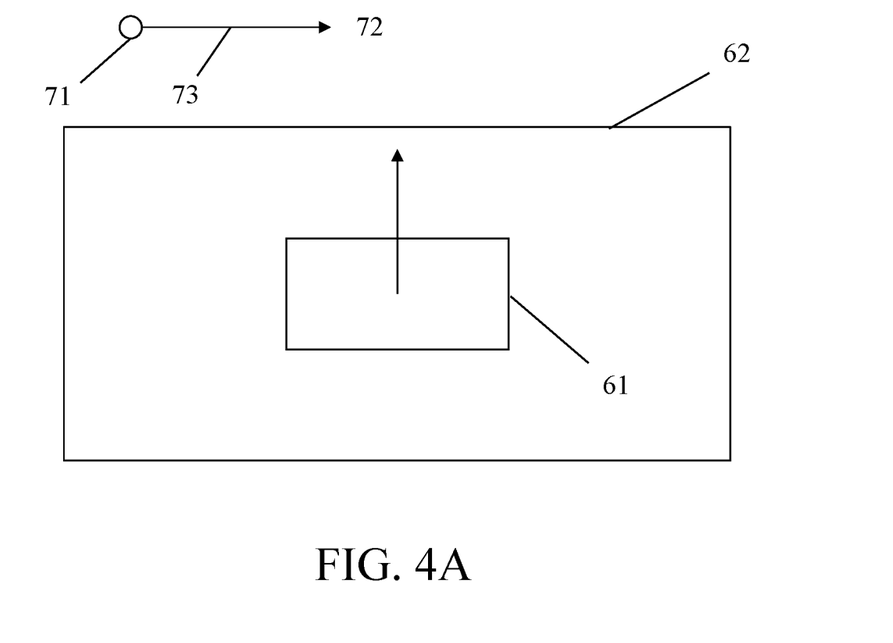
FIGS. 4A and 4B are schematic views of a spraying range and an early-warning range of an automatic spraying operation, according to the present invention.
Figure 4B:
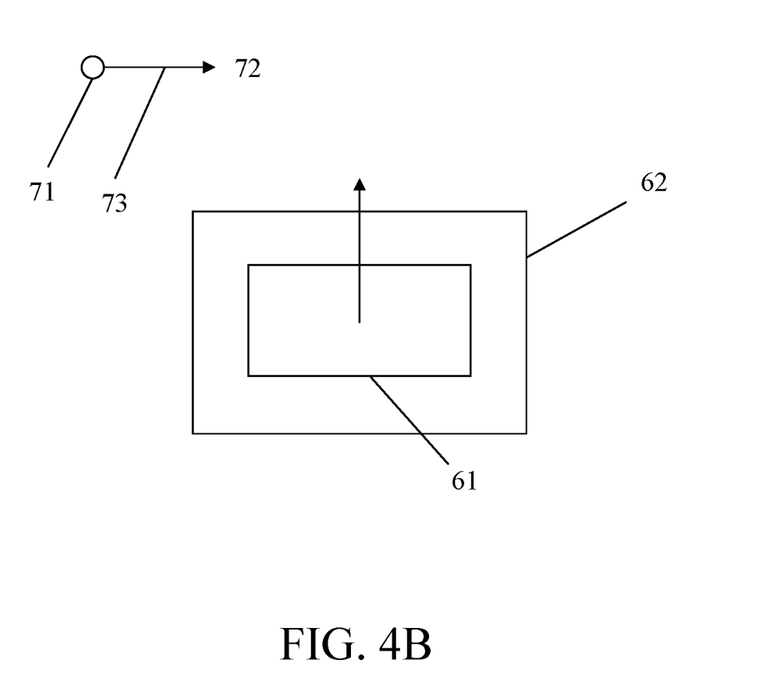

Please refer to FIGS. 4A and 4B, which are schematic views of the spraying range and the early-warning range of the automatic spraying operation, according to the present invention. As shown in FIGS. 4A and 4B, the range calculation module 16 determines that the forward direction 72 of the staff 71 is intersected with the spraying range 61, and the forward speed 73 of the staff 71 shown in FIG. 4A is greater than the forward speed 73 of the staff 71 shown in FIG. 4B. In FIGS. 4A and 4B, the range calculation module 16 calculates the component of the flight speed in the forward direction as zero, subtracts the flight speed by the component and uses the absolute value of the subtraction result as the relative speed; as a result, the calculated relative speed in FIG. 4A is greater than the calculated relative speed in FIG. 4B. Next, the range calculation module 16 multiplies the relative speed by the early-warning time (the early-warning time in FIGS. 4A and 4B are the same), so as to calculate an preset distance; the calculated preset distance in FIG. 4A is greater than the calculated preset distance in FIG. 4B, so the early-warning range 62 calculated by extending outwardly from the spraying range 61 by the preset distance in FIG. 4A is greater than the early-warning range 62 calculated by extending outwardly from the spraying range 61 by the preset distance in FIG. 4B. Therefore, the early-warning range 62 can be dynamically adjusted in response to the change in the forward speed 73 of the staff 71.

Figure 5:
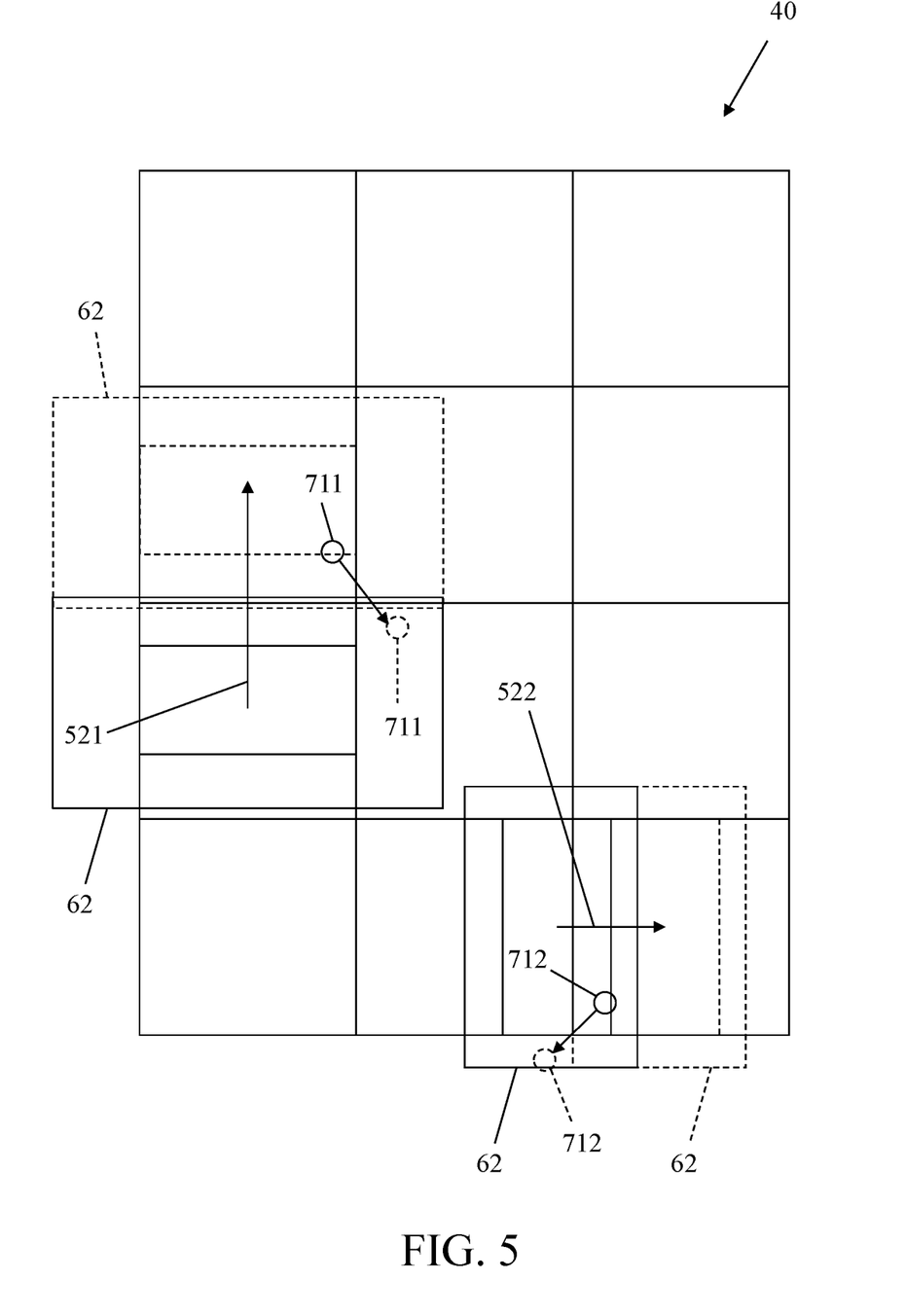
FIG. 5 is a schematic view showing a flight path of an automatic spraying unmanned aerial vehicle (UAV) system based on dynamic adjustment of early warning range, according to the present invention.

When determining that a first staff 711 appears within the early-warning range 62 in the environment video, the spraying control module 17 controls the unmanned aerial vehicle to pause the automatic spraying operation and records a first flight path 521 where the unmanned aerial vehicle 10 pauses the automatic spraying operation. Please refer to FIG. 5, which shows a schematic view of the first flight path 521. FIG. 5 is a schematic view showing the flight path of the automatic spraying operation, according to the present invention. When determining that a second staff 712 appears within the early-warning range 62 in the environment video, the spraying control module 17 controls the unmanned aerial vehicle 10 to pause the automatic spraying operation and records a second flight path 522 where the unmanned aerial vehicle 10 pauses the automatic spraying operation. Please refer to FIG. 5, which shows a schematic view of the second flight path 522. It should be noted that, when the spraying control module 17 controls the unmanned aerial vehicle 10 to pause the automatic spraying operation, the unmanned aerial vehicle 10 broadcasts a warning voice message and a warning sound to prompt the automatic spraying operation, so as to prompt the first staff 711 or the second staff 712 to leave the spraying range of the automatic spraying operation as soon as possible.

Figure 6:
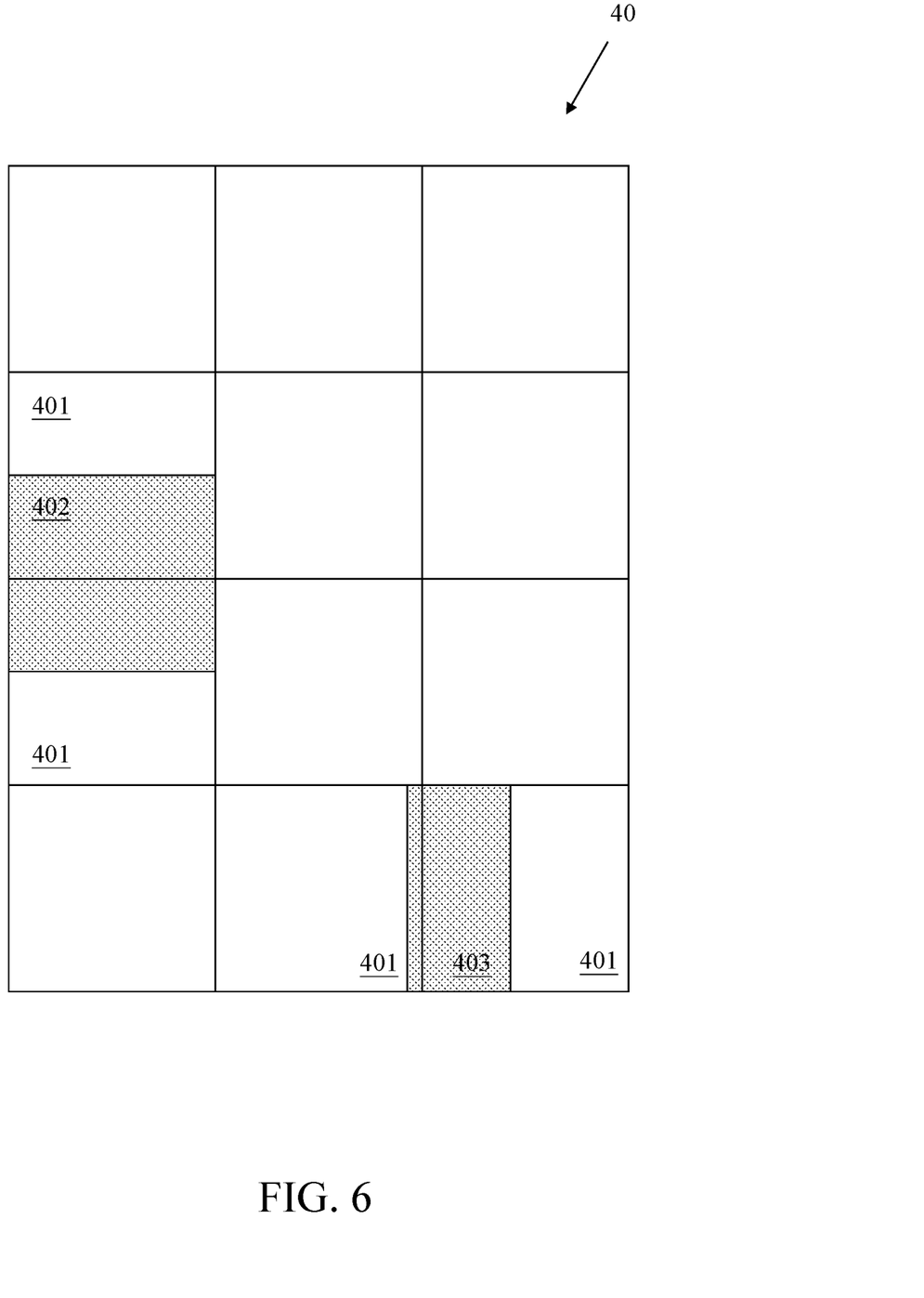
FIG. 6 is schematic view showing marked operation sub-areas of an automatic spraying operation, according to the present invention.

As shown in FIG. 5, the early-warning range 62 where the unmanned aerial vehicle pauses the automatic spraying operation, the initial positions of the first staff 711 and the second staff 712 are drawn with solid lines; the early-warning range 62 where the unmanned aerial vehicle resumes the automatic spraying operation, the positions of the first staff 711 and the second staff 712 after moving are drawn with dashed lines, an arrow between the first staff 711 drawn by solid line and the first staff 711 drawn by dashed line is the forward direction of the first staff 711, and an arrow between the second staff 712 drawn by solid line and the second staff 712 drawn by dashed line is the forward direction of the second staff 712. It is obvious that the dynamically-adjustment of the early-warning range 62 can differentiate the ranges of the first marked area 402 and the second marked area 403, where the automatic spraying operation is paused, such as dot areas shown in FIG. 6. FIG. 6 is schematic view showing marked operation sub-areas of the automatic spraying operation, according to the present invention. Each of the first marked area 402 and the second marked area 403 is also called as a marked range.

When determining that the first staff 711 or the second staff 712 does not appear in the early-warning range 62 in the environment video obtained by the image analysis module 15, the spraying control module 17 controls the unmanned aerial vehicle 10 to resume the automatic spraying operation and stops recording the first flight path 521 or the second flight path 522. When the spraying control module 17 controls the unmanned aerial vehicle 10 to resume the automatic spraying operation, the unmanned aerial vehicle 10 broadcasts a warning voice message and warning sound to the prompt automatic spraying operation and also prompt the first staff 711 or the second staff 712, who has left the operation range already, that the automatic spraying operation will be resumed.

When the unmanned aerial vehicle 10 completes the automatic spraying operation based on the operation path 51 and the spraying control module 17 records the first flight path 521 and/or the second flight path 522, the UAV transmission module 12 transmits the recorded first flight path 521 and/or second flight path 522 to the path server 20, and the server transmission module 21 receives the recorded first flight path 521 and/or second flight path 522 from the UAV transmission module 12.

When the server transmission module 21 receives the recorded first flight path 521 and second flight path 522 from the UAV transmission module 12, a first marked area 402 and a second marked area 403 drawn as dot areas in FIG. 6 are generated based on the first flight path 521, the second flight path 522 and the early-warning range 62.

Figure 7:
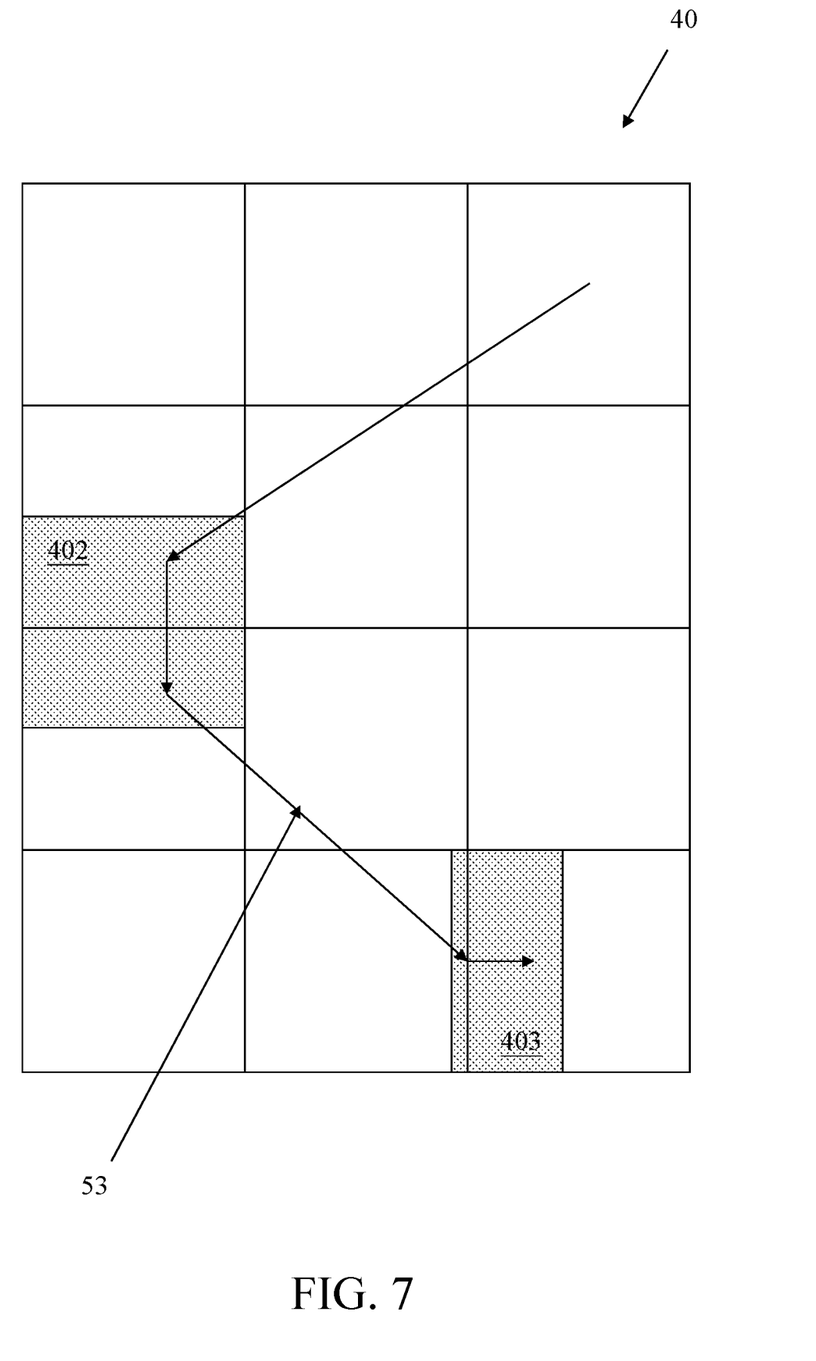
FIG. 7 is a schematic view showing a second operation path of an automatic spraying operation, according to the present invention.

Next, the path generation module 23 generates a second operation path 53 based on the position information, the first marked area 402 and the second marked area 403, as shown in FIG. 7, which shows a schematic view of the second operation path of the automatic spraying operation, according to the present invention. The server transmission module 21 transmits the second operation path 53 to the unmanned aerial vehicle 10.

When the UAV transmission module 12 receive the second operation path 53 from the server transmission module 21, the flight control module 14 controls the unmanned aerial vehicle 10 to perform the automatic spraying operation again based on the flight altitude and the second operation path. It should be noted that the unmanned aerial vehicle 10 only performs the automatic spraying operation in the first marked area 402 and the second marked area 403, and when the unmanned aerial vehicle 10 approaches a prompt distance away from the first marked area 402 or the second marked area 403 along the second operation path, the unmanned aerial vehicle 10 broadcasts a warning voice message and warning sound to prompt the automatic spraying operation, thereby prompting that the unmanned aerial vehicle 10 is about to perform the automatic spraying operation.

When the range calculation module 16 does not calculate the early-warning range 62 and an unexpected staff appears in the environment video and adjacent to the spraying range 61, the spraying control module 17 pauses the automatic spraying operation and records the flight path where the unmanned aerial vehicle 10 pauses the automatic spraying operation; when the unexpected staff appearing in the environment video leaves the spraying range 61, the spraying control module 17 resumes the automatic spraying operation and stops recording the flight path of the unmanned aerial vehicle 10 after the unexpected staff appearing in the environment video is away from the spraying range 61 for the preset period.

The image analysis module 15 analyzes the spraying range 61 in the environment video to generate an offset direction and an offset distance, and the flight control module 14 generates a control command based on the offset distance to control the unmanned aerial vehicle 10 to move the offset distance in a direction opposite to the offset direction, thereby adjusting a position of the spraying range 61.

The operation of the method of the present invention will be illustrated in the following paragraphs. Please refer to FIGS. 4A and 4B, which are flowcharts of an automatic spraying unmanned aerial vehicle method based on dynamic adjustment of early warning range, according to the present invention.

As shown in FIGS. 4A and 4B, the automatic spraying unmanned aerial vehicle method includes the following steps.

Figure 8A:
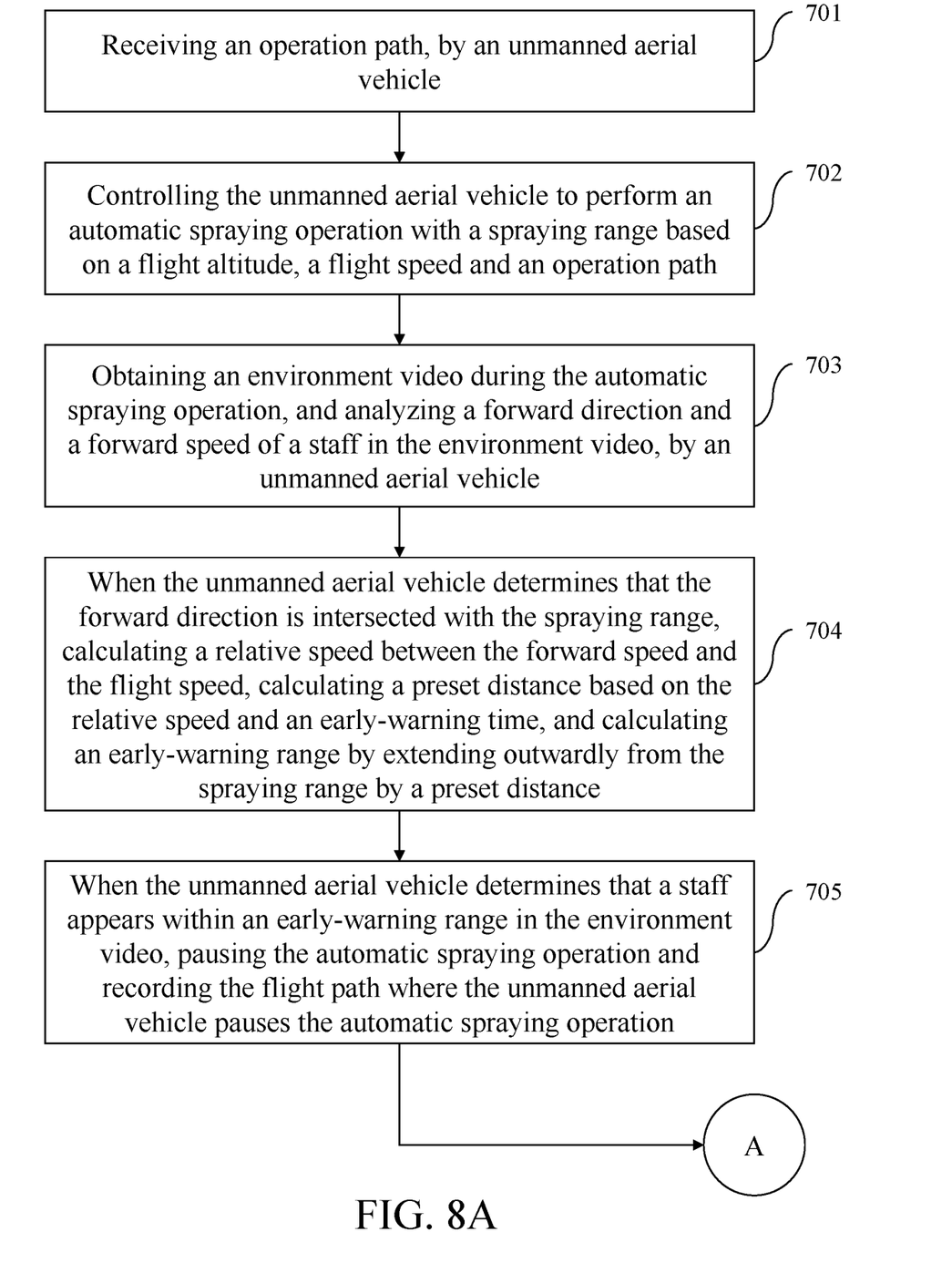
FIGS. 8A and 8B are flowcharts of an automatic spraying unmanned aerial vehicle method based on dynamic adjustment of early warning range, according to the present invention.
Figure 8B:
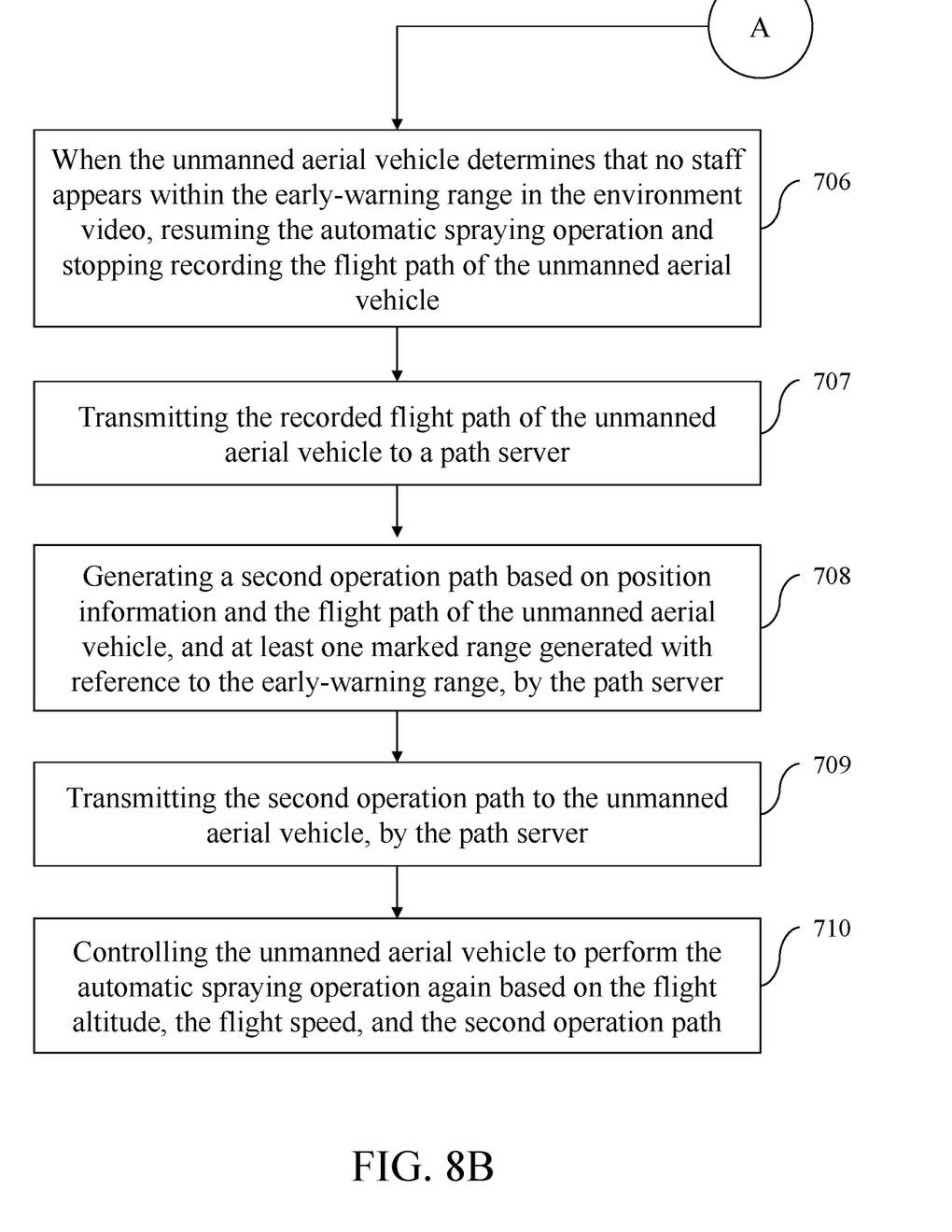

In a step 701, an unmanned aerial vehicle receives an operation path. In a step 702, the unmanned aerial vehicle is controlled to perform an automatic spraying operation with a spraying range based on a flight altitude, a flight speed and an operation path. In a step 703, the unmanned aerial vehicle obtains an environment video during the automatic spraying operation, and analyzes a forward direction and a forward speed of a staff in the environment video. In a step 704, when the unmanned aerial vehicle determines that the forward direction is intersected with the spraying range, the unmanned aerial vehicle calculates a relative speed between the forward speed and the flight speed, calculates a preset distance based on the relative speed and an early-warning time, and calculates an early-warning range by extending outwardly from the spraying range by a preset distance. In a step 705, when the unmanned aerial vehicle determines that a staff appears within an early-warning range in the environment video, the unmanned aerial vehicle pauses the automatic spraying operation and records the flight path where the unmanned aerial vehicle pauses the automatic spraying operation. In a step 706, when the unmanned aerial vehicle determines that no staff appears within the early-warning range in the environment video, the unmanned aerial vehicle resumes the automatic spraying operation and stops recording the flight path of the unmanned aerial vehicle. In a step 707, the unmanned aerial vehicle transmits the recorded flight path of the unmanned aerial vehicle to a path server. In a step 708, the path server generates a second operation path based on position information and the flight path of the unmanned aerial vehicle, and at least one marked range generated with reference to the early-warning range. In a step 709, the path server transmits the second operation path to the unmanned aerial vehicle. In a step 710, the unmanned aerial vehicle is controlled to perform the automatic spraying operation again based on the flight altitude, the flight speed, and the second operation path.

According to the above-mentioned contents, the difference between the present invention and the conventional technology is that the unmanned aerial vehicle of the automatic spraying UAV system of the present invention analyzes the forward direction and the forward speed of the staff appearing in the environment video, calculates the preset distance, and generates the early-warning range by extending outwardly the spraying range by the preset distance; when determining the staff appears within the early-warning range in the environment video, the unmanned aerial vehicle pauses the automatic spraying operation.

Therefore, the technical solution of the present invention is able to solve the conventional technology problem that the conventional unmanned aerial vehicle may cause safety concerns because the conventional unmanned aerial vehicle only performs the automatic spraying operation along the preset path and is unable to intelligently control the automatic spraying operation when an unexpected staff appears in the operation area, thereby achieving the technical effect of improving safety of the staff in an operation area by dynamically adjusting the early-warning range of the automatic spraying operation of the unmanned aerial vehicle.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. An automatic spraying unmanned aerial vehicle (UAV) system based on dynamic adjustment of an early warning range, comprising:
    an unmanned aerial vehicle (UAV) comprising:
        a UAV transmission module configured to receive an operation path, transmit a recorded flight path of the unmanned aerial vehicle, and receive a second operation path;
        a flight control module configured to control the unmanned aerial vehicle to perform an automatic spraying operation with a spraying range based on a flight altitude, a flight speed and an operation path, and control the unmanned aerial vehicle to perform the automatic spraying operation with the spraying range again based on the flight altitude, the flight speed and a second operation path;
        an image analysis module configured to obtain an environment video during the automatic spraying operation of the unmanned aerial vehicle, and analyze a forward direction and a forward speed of a staff in the environment video;
        a range calculation module, wherein when determining that the forward direction is intersected with the spraying range, the range calculation module calculates a relative speed between the forward speed and the flight speed, calculates a preset distance based on the relative speed and an early-warning time, and calculates an early-warning range by extending outwardly from the spraying range by a preset distance; and
        a spraying control module, wherein when determining that the staff appears within the early-warning range in the environment video, the spraying control module pauses the automatic spraying operation, and records a flight path where the unmanned aerial vehicle pauses the automatic spraying operation, wherein when determining that no staff appears within the early-warning range in the environment video, the spraying control module resumes the automatic spraying operation and stops recording the flight path of the unmanned aerial vehicle; and
    a path server comprising:
        a server transmission module configured to receive the recorded flight path of the unmanned aerial vehicle from the UAV transmission module, and transmit the second operation path to the UAV transmission module; and
        a path generation module configured to generate the second operation path based on position information and the flight path of the unmanned aerial vehicle, and at least one marked range generated with reference to the early-warning range.

2. The automatic spraying unmanned aerial vehicle (UAV) system based on dynamic adjustment of early warning range according to claim 1, wherein when the range calculation module does not calculate the early-warning range and an unexpected staff appears in the environment video and adjacent to the spraying range, the spraying control module pauses the automatic spraying operation and records the flight path where the unmanned aerial vehicle pauses the automatic spraying operation, and when the unexpected staff appearing in the environment video leaves the spraying range, the spraying control module resumes the automatic spraying operation and stops recording the flight path of the unmanned aerial vehicle after the unexpected staff appearing in the environment video is away from the spraying range for a preset period.

3. The automatic spraying unmanned aerial vehicle (UAV) system based on dynamic adjustment of early warning range according to claim 1, wherein when the image analysis module analyzes the spraying range in the environment video to generate an offset direction and an offset distance, the flight control module generates a control command based on the offset distance, to control the unmanned aerial vehicle to move an offset distance in a direction opposite to the offset direction.

4. The automatic spraying unmanned aerial vehicle (UAV) system based on dynamic adjustment of early warning range according to claim 1, wherein the spraying range is calculated by the range calculation module based on the flight altitude, the flight speed, environment information and droplet dispersion information, or the spraying range is calculated by an external device or an external server based on the flight altitude, the flight speed, the environment information and the droplet dispersion information.

5. The automatic spraying unmanned aerial vehicle (UAV) system based on dynamic adjustment of early warning range according to claim 1, wherein when the spraying control module pauses or resumes the automatic spraying operation, the unmanned aerial vehicle broadcasts a warning voice message or a warning sound to prompt the automatic spraying operation, wherein when the unmanned aerial vehicle approaches a prompt distance away from at least one marked area along the second operation path, the unmanned aerial vehicle broadcasts the warning voice message and the warning sound to prompt the automatic spraying operation.

6. An automatic spraying unmanned aerial vehicle (UAV) method based on dynamic adjustment of early warning range, comprising:
  receiving an operation path, by an unmanned aerial vehicle;
  controlling the unmanned aerial vehicle to perform an automatic spraying operation with a spraying range based on a flight altitude, a flight speed and an operation path;
  obtaining an environment video during the automatic spraying operation, and analyzing a forward direction and a forward speed of a staff in the environment video;
  when the unmanned aerial vehicle determines that the forward direction is intersected with the spraying range, calculating a relative speed between the forward speed and the flight speed, calculating a preset distance based on the relative speed and an early-warning time, and calculating an early-warning range by extending outwardly from the spraying range by a preset distance;
  when the unmanned aerial vehicle determines that a staff appears within an early-warning range in the environment video, pausing the automatic spraying operation and recording the flight path where the unmanned aerial vehicle pauses the automatic spraying operation;
  when the unmanned aerial vehicle determines that no staff appears within the early-warning range in the environment video, resuming the automatic spraying operation and stopping recording the flight path of the unmanned aerial vehicle;
  transmitting the recorded flight path of the unmanned aerial vehicle to a path server;
  generating a second operation path based on position information and the flight path of the unmanned aerial vehicle, and at least one marked range generated with reference to the early-warning range, by the path server;
  transmitting the second operation path to the unmanned aerial vehicle, by the path server; and
  controlling the unmanned aerial vehicle to perform the automatic spraying operation again based on the flight altitude, the flight speed, and the second operation path.

7. The automatic spraying unmanned aerial vehicle method based on dynamic adjustment of early warning range according to claim 6, further comprising:
  when the unmanned aerial vehicle does not calculate the early-warning range and an unexpected staff appears in the environment video and adjacent to the spraying range, pausing the automatic spraying operation and recording the flight path where the unmanned aerial vehicle pauses the automatic spraying operation, by the unmanned aerial vehicle; and
  when the unexpected staff appearing in the environment video leaves the spraying range, resuming the automatic spraying operation and stopping recording the flight path of the unmanned aerial vehicle after the unexpected staff appearing in the environment video is away from the spraying range for a preset period, by the unmanned aerial vehicle.

8. The automatic spraying unmanned aerial vehicle method based on dynamic adjustment of early warning range according to claim 6, further comprising:
  when the unmanned aerial vehicle analyzes the spraying range in the environment video to generate an offset direction and an offset distance, generating a control command based on the offset distance, to control the unmanned aerial vehicle to move an offset distance in a direction opposite to the offset direction, by the unmanned aerial vehicle.

9. The automatic spraying unmanned aerial vehicle method based on dynamic adjustment of early warning range according to claim 6, wherein the step of controlling the unmanned aerial vehicle to perform the automatic spraying operation with the spraying range based on the flight altitude, the flight speed and the operation path, comprises: calculating the spraying range based on the flight altitude, the flight speed, environment information and droplet dispersion information, or calculating the spraying range based on the flight altitude, the flight speed, the environment information and the droplet dispersion information, by an external device or an external server.

10. The automatic spraying unmanned aerial vehicle method based on dynamic adjustment of early warning range according to claim 6, further comprising:
  when the unmanned aerial vehicle pauses or resumes the automatic spraying operation, broadcasting a warning voice message or a warning sound to prompt the automatic spraying operation; and
  when the unmanned aerial vehicle approaches a prompt distance away from at least one marked area along the second operation path, broadcasting the warning voice message and the warning sound to prompt the automatic spraying operation.

* * * * *